Figure 3:
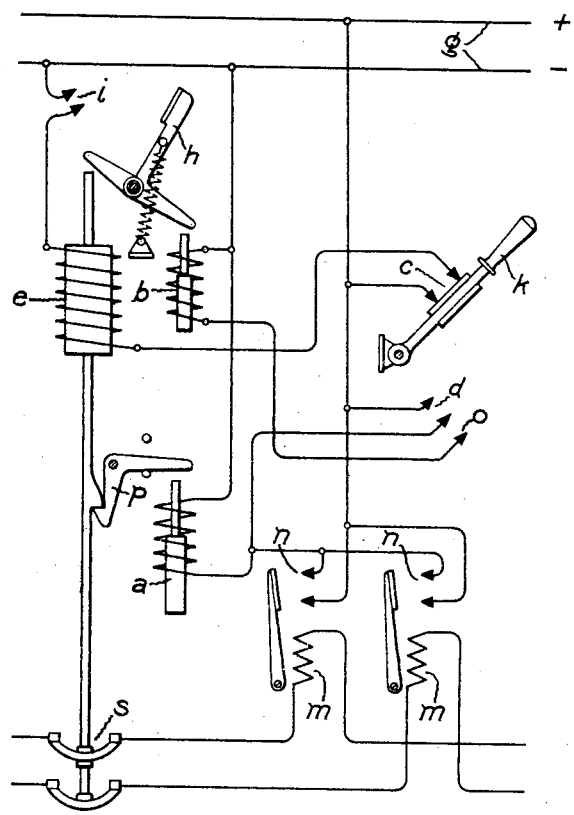

G. WOLFF.
ELECTRIC SWITCH.
APPLICATION FILED JAN. 21, 1913.
1,180,751.
Patented Apr. 25, 1916.
2 SHEETS—SHEET 1.
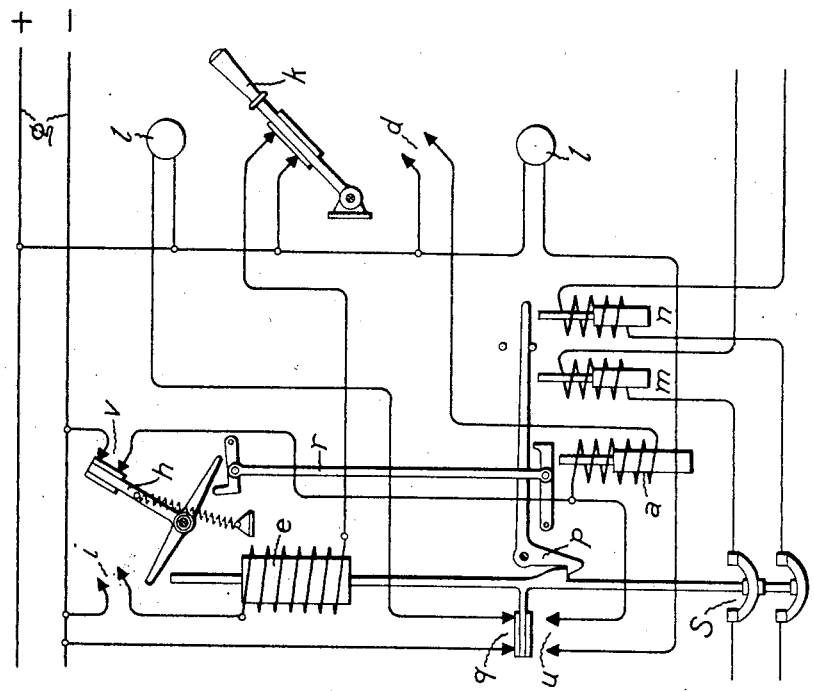
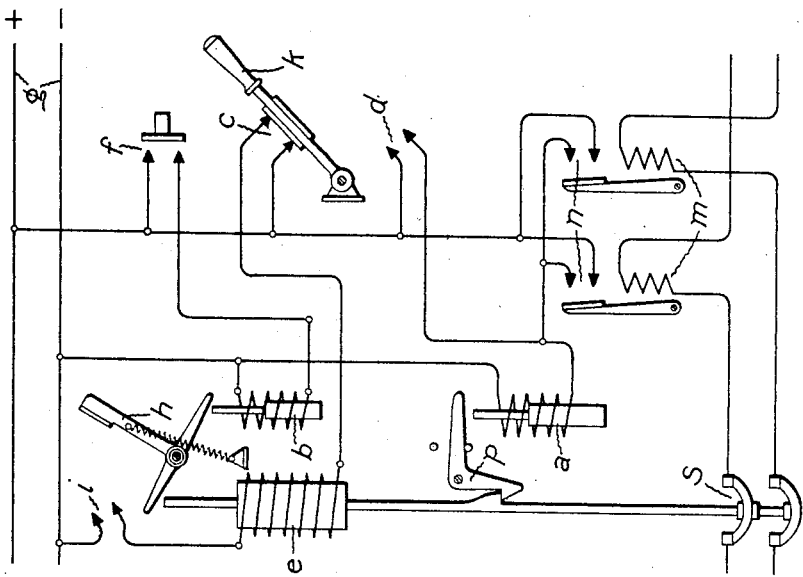
Witnesses:
Earl G. Klock.
J. Ellis Glen
Inventor:
Georg Wolff,
by Allen & Davis
His Attorney.

G. WOLFF.
ELECTRIC SWITCH.
APPLICATION FILED JAN. 21, 1913.

1,180,751.

Patented Apr. 25, 1916.
2 SHEETS—SHEET 2.

Inventor:
Georg Wolff,
by Albert G. Davis
His Attorney.

UNITED STATES PATENT OFFICE.

GEORG WOLFF, OF HERMSDORF, NEAR BERLIN, GERMANY, ASSIGNOR TO GENERAL ELECTRIC COMPANY, A CORPORATION OF NEW YORK.

ELECTRIC SWITCH.

1,180,751.  Specification of Letters Patent.  Patented Apr. 25, 1916.

Application filed January 21, 1913. Serial No. 743,317.

*To all whom it may concern:*

Be it known that I, GEORG WOLFF, a subject of the Emperor of Germany, residing at Hermsdorf, near Berlin, Germany, have invented certain new and useful Improvements in Electric Switches, of which the following is a specification.

My invention relates to electric switches and particularly to switches which automatically open upon the occurrence of some abnormal condition such as an overload, and which may be closed at will by means of a controller mounted at some convenient point.

In electric switches which open automatically upon the occurrence of overload and other abnormal condition and which may be closed by means of a control switch, there is danger that if the main switch is closed when there is a short circuit or other abnormal condition present the switch will trip open and will then immediately close because the control switch is apt to be still in circuit-closing position when the main switch opens. Under these conditions the main switch will rapidly open and close as long as the control switch remains in circuit-closing position, and this oscillation of the main switch may lead to destruction of the contacts and to damage to the installation.

In order to prevent oscillation of the main switch under these conditions it has been proposed to use special electromagnetic safety devices or switches which will disconnect the actuating mechanism of the main switch from its source of power as soon as the main switch opens automatically and will keep it disconnected as long as the control switch is in circuit-closing position. These devices do not give absolute security against the danger of the main switch oscillating, since in their use an unfailing action of these electromagnetic devices is presupposed. If a fault occurs in these electromagnetic safety devices or in their supply conductors the devices fail to act and then the oscillation of the main switch can occur. The danger that these electromagnetic safety devices may fail to act in case of need is increased by the fact that they become active only in the rare case of a short circuit being present when the main switch is closed and consequently the safety devices may be defective for a long time without that fact being discovered.

The object of my invention is to provide a thoroughly positive and reliable means for preventing the oscillation or continuous opening and closing of the main switch.

A further object is to prevent the oscillation of the main switch by safety means which will respond every time the main switch is opened and closed in any manner so that a fault in the safety means will be discovered during use of the switch under normal conditions and can be remedied before any damage is done. To this end I so arrange the device that after the closing circuit of the main switch is opened automatically it cannot be closed except by a special manipulation which is different from merely placing the control switch in switch-closing position, and which must be performed before the main switch can be closed. In the preferred construction some suitable form of auxiliary switch opens the closing circuit of the main switch, and the auxiliary switch does not again close automatically, but must be closed by some special manipulation, and until the auxiliary switch is closed it is impossible to close the main switch.

For a better understanding of my invention, reference may be had to the accompanying drawing which merely for purposes of illustration shows some of the various forms in which my invention may be embodied and in which—

Figure 1 is a diagrammatic view of one form of remote control switch embodying my invention and Figs. 2 and 3 are diagrammatic views of modified forms of remote control switches in which my invention is embodied in slightly different forms.

In Fig. 1 there is represented by S an electric switch which is closed by means of some suitable power actuating mechanism. such as an actuating solenoid or magnet *e* and is held in closed position by the catch *p*. The actuating mechanism is energized from any desired source of power through a suitable controller. For example, the actuating magnet *e* is energized from any desired source of current *g*, through a closing circuit which is closed at the contacts *c* by a control switch or controller *k*. As the main switch closes the actuating magnet automatically breaks its own closing circuit at *i* by throwing an auxiliary switch *h* into circuit breaking position. Even though the main switch S is again opened the auxiliary switch *h* remains open until positively returned to the position in which it bridges the contact *c* in the closing circuit of the actuating magnet. The opening of the main switch is effected by releasing the catch *p* by means of a trip coil *a*. The energizing circuit of the trip coil may be closed at will by the control switch or controller *k* bridging the contacts *d*, or automatically by an overload device *m* bridging the contacts *n*. If the main switch is opened automatically it cannot be closed without any further or other manipulation than merely bridging the control contact *c* with the control switch *k*, because the auxiliary switch *h* is still keeping the closing circuit of the actuating magnet *e* open at the contacts *i*. To permit the main switch to be closed I provide some suitable means by which with proper manipulation the auxiliary switch *h* can be brought into position to bridge the contacts *i* and thereby put the closing circuit of the switch in condition to respond to the control switch *k*. In the particular arrangement shown the auxiliary switch *h* is thrown back to the position in which it bridges the contacts *i*, by an auxiliary circuit making magnet *b* which is energized when its circuit is closed by means of a push-button switch or similar circuit controlling device *f*. The auxiliary switch *h* must first be thrown back by the magnet *b* into position to bridge the contacts *i* before the actuating mechanism *e* can be energized by means of the control switch *k*.

When a short circuit or other abnormal condition exists the main switch S is opened automatically by the overload device *m*, but even though the control switch *k* is held in switch-closing position on the contacts *c*, the main switch S can never close immediately, as its closing circuit is still open at the contacts *i* and therefore oscillation of the main switch is prevented. If the main switch has been tripped open it will not again close until the operator performs the special manipulation required to close the auxiliary switch *h*.

In case some defect in the device develops, as for example the failure of the magnet *b* to act, oscillation of the main switch is nevertheless prevented, because in that case the auxiliary switch *h* which automatically opened when the main switch closed, cannot be closed again as long as the magnet *b* is defective. A failure of any part of the device as a result of a gradually developing defect is very unlikely, since not only the auxiliary switch *h*, but also the magnets *a* and *b*, come into action every time the main switch is opened and closed, and this occurs even though the operation of the main switch is due solely to the control switch *k*. Any defect in the mechanism may therefore be detected during the normal operation of the switch and can be corrected before any damage is done.

Instead of providing a special circuit-controlling device *f* for the circuit of the auxiliary magnet *b* the circuit of this magnet may be closed by means of the control switch *k* through the contact *o* and the connections shown in Fig. 3. When these connections are used and the main switch has opened automatically, the control switch *k* must be brought into circuit-opening position before the main switch will again close, because the auxiliary switch *h* remains open until the contact *o* is engaged by the control switch *k*. When the main switch is opened from the control switch *k* the same movement of the control switch which energizes the trip coil *a* and causes the main switch to open, of course simultaneously energizes the auxiliary magnet *b* and throws the auxiliary switch *h* into engagement with the contacts *i*, so that the main switch will then close as soon as the control switch *k* is thrown into switch-closing position in engagement with contacts *c*.

Fig. 2 shows diagrammatically a somewhat similar remote control switch in which the overload coils *m* and *n* act directly upon the catch *p*. In this case a special auxiliary magnet, such as *b* in Fig. 1, is not necessary, for the auxiliary switch *h* is thrown back into engagement with the contacts *i* by the trip coil *a* which is energized by bringing the control switch *k* into engagement with the contacts *d* when it is desired to open the main switch at will. The armature of the trip coil *a* engages the latch *p* and also closes the auxiliary switch *h* through a rod *r*, the parts being so arranged that when the trip coil *a* is energized the latch *p* is moved to release the main switch and at the same time the auxiliary switch *h* is thrown into engagement with the contacts *i*. The catch *p* may be released either by the overload coils *m* and *n*, or by the trip coil *a*, which operates independently of the overload coils.

To provide for the automatic interruption of the tripping circuit shunt contacts *v* are mounted in a position to be bridged by the auxiliary switch *h* when that switch opens the circuit of the actuating magnet *e*. These shunt contacts coöperate with contacts *q* and *u*, controlled by the main switch, to light signal lamps *l* adjacent the control switch *k* and thereby indicate whether the main switch is opened or closed. In this particular form of switch, as well as in the form shown in Fig. 1, the control switch $k$ must be moved to switch-opening position after the automatic opening of the main switch in order to put the closing circuit in such condition that the main switch will close when the control switch $k$ is thrown to the closing position in engagement with the contacts $c$. After the main switch has been opened or closed the control switch can be left in the position it was last given and need not be returned to an intermediate or zero position. An ordinary double throw lever switch may be employed as a control switch, but push-button switches, rotatable switches, push-buttons and the like may be used instead if desired.

In the particular embodiments of my invention above described, it has been assumed for the sake of simplicity that the switch S is rigidly connected with the actuating magnet $e$. If desired, however, a suitable form of connection may be used between the switch and the actuating magnet by which the switch will trip from the actuating mechanism upon overload without any modification being required in the remainder of the device.

What I claim as new and desire to secure by Letters Patent of the United States, is,—

1. In combination with an automatic circuit breaker having electroresponsive tripping means and electromagnetic closing means, of a control switch operatively related to both said tripping and closing means, contacts in the circuit of said closing means bridged by said control switch when in circuit breaker-closing position, contacts in the circuit of said tripping means bridged by said control switch when in circuit breaker-opening position, contacts in parallel with said second mentioned contacts adapted to be bridged in response to overload on the main circuit, and an auxiliary switch for opening a gap in the circuit of said closing means only in response to the movement of said closing means into switch closing position and for closing said gap only in response to the bridging of said second mentioned contacts by said control switch whereby said auxiliary switch is closed by said control switch prior to the bridging of said first mentioned contacts.

2. In combination with an automatic circuit breaker, holding means for maintaining said breaker closed, electroresponsive tripping means for releasing said holding means, electroresponsive means for closing said breaker, a control switch movable at will in one direction to close the energizing circuit of said tripping means and in the other direction to close the energizing circuit of said closing means, means for also closing the energizing circuit of said tripping means automatically in response to predetermined electrical conditions, an auxiliary switch for controlling a gap in the circuit of said closing means, said auxiliary switch being opened in response to the closing of said breaker and held in open position while said breaker is opened either at will or automatically, a closing coil for closing said auxiliary switch, and a second control switch for controlling the circuit of said closing coil whereby said second control switch must be operated prior to the movement of said first mentioned control switch to close the energizing circuit of said closing means.

3. In combination with an automatic circuit breaker having holding means for maintaining said circuit breaker closed, a tripping coil operative either at will or automatically to release said holding means, electroresponsive closing means for moving said breaker from open to closed position, an auxiliary switch for controlling the circuit of said closing means, said auxiliary switch being opened in response to the closing of said breaker and prevented from closing while said breaker is closed, means for holding said auxiliary switch open when said breaker is opened either at will or automatically, an independent closing coil for closing said auxiliary switch, and a control switch for controlling said closing coil whereby said control switch must be operated to close said auxiliary switch before the breaker can be closed by said closing means.

4. In combination with an automatic circuit breaker having holding means for maintaining said circuit breaker closed, electroresponsive means operative either at will or automatically to release said holding means, electroresponsive closing means for moving said breaker from open to closed position, an auxiliary switch for controlling the circuit of said closing means, means for holding said auxiliary switch open while said breaker is closed and for maintaining said switch open when the breaker opens either at will or automatically, a closing coil for closing said auxiliary switch when said breaker is opened, a control switch for operating said closing coil, and a second control switch for completing the circuit of said closing means to close said breaker after said first mentioned control switch is closed.

5. In combination with an automatic circuit breaker having holding means for maintaining said circuit breaker closed, electroresponsive means operative either at will or automatically to release said holding means, electroresponsive closing means for moving said breaker from open to closed position, a control switch for closing the energizing circuit of said closing means, an auxiliary switch normally open to provide a gap in the circuit of said closing means, means for holding said switch open when said breaker opens either at will or automatically, independent means for operating said auxiliary switch to close said gap whereby the circuit of said closing means can then be closed by said control switch to operate said closing means.

In witness whereof, I have hereunto set my hand this seventh day of December, 1912.

GEORG WOLFF.

Witnesses:
 HENRY HASPER,
 WOLDEMAR HAUPT.

Copies of this patent may be obtained for five cents each, by addressing the "Commissioner of Patents, Washington, D. C."